(12) United States Patent
Roys

(10) Patent No.: US 10,054,261 B2
(45) Date of Patent: Aug. 21, 2018

(54) MONO-MATERIAL DIVIDER BLOCK ASSEMBLY

(71) Applicant: Curtis Roys, Fredericksburg, TX (US)

(72) Inventor: Curtis Roys, Fredericksburg, TX (US)

(*) Notice: Subject to any disclaimer, the term of this patent is extended or adjusted under 35 U.S.C. 154(b) by 0 days.

(21) Appl. No.: 15/297,131

(22) Filed: Oct. 18, 2016

(65) Prior Publication Data

US 2017/0167660 A1 Jun. 15, 2017

Related U.S. Application Data

(63) Continuation of application No. 14/171,434, filed on Feb. 3, 2014, now Pat. No. 9,470,363.

(51) Int. Cl.
*F16N 25/02* (2006.01)
*F16N 25/00* (2006.01)

(52) U.S. Cl.
CPC ............ *F16N 25/00* (2013.01); *F16N 25/02* (2013.01)

(58) Field of Classification Search
None
See application file for complete search history.

(56) References Cited

U.S. PATENT DOCUMENTS

| | | | |
|---|---|---|---|
| 2,143,733 A | 1/1939 | Hillis | |
| 2,184,778 A | 12/1939 | Hillis | |
| 2,345,370 A | 3/1944 | Zumeta et al. | |
| 2,584,890 A | 2/1952 | Leonard | |
| 2,766,847 A | 10/1956 | Harter | |
| 3,422,926 A | 1/1969 | Stanaway | |
| 3,586,129 A | 6/1971 | Cass | |
| 3,602,336 A | 8/1971 | Downs | |
| 3,664,462 A | 5/1972 | Smith, Sr. | |
| 4,082,324 A | 4/1978 | Obrecht | |
| 4,312,425 A | 1/1982 | Snow et al. | |
| 4,572,331 A | 2/1986 | Powell et al. | |
| 4,895,192 A | 1/1990 | Mortenson | |
| 5,285,871 A | 2/1994 | Sievenpiper | |
| 5,605,179 A | 2/1997 | Strong, Jr. et al. | |
| 5,810,115 A | 9/1998 | Mismas | |
| 5,835,372 A | 11/1998 | Roys et al. | |
| 6,085,783 A | 7/2000 | Hollingshead | |
| 7,096,889 B1 | 8/2006 | Roys | |
| 9,470,363 B2 | 10/2016 | Roys | |
| 2013/0118603 A1* | 5/2013 | Klaphake | F15B 13/0842 137/119.01 |

OTHER PUBLICATIONS

Unknown, "Trabon MSP Modular Divider Valves," Graco, last accessed May 14, 2014.

* cited by examiner

*Primary Examiner* — John Fox
(74) *Attorney, Agent, or Firm* — Scheinberg & Associates, PC; Michael O. Scheinberg

(57) ABSTRACT

The invention is directed to a divider block assembly made from one piece of material. Traditional divider blocks require modular sections so that piston alignment can be calibrated precisely. The current invention uses replaceable pistons and sleeves that are suitable for use at high fluid pressures. The use of these pistons also allows for a single, bodied, one-piece, metal divider body, rather than the conventional multiple block divider blocks, which allows for a more efficient manufacturing method and stronger, more reliable, and more efficient lubricant dispensing system. The use of any of these aspects separately can improve performance, and not all are required in every embodiment.

6 Claims, 9 Drawing Sheets

MONO-MATERIAL DIVIDER BLOCK ASSEMBLY

TECHNICAL FIELD OF THE INVENTION

The present invention relates to a divider block assembly that is made from one material, such as steel. Other than this invention, there is no current technology that enables anyone to make a complicated lubrication system (with the sophistication and exactness that is required in high performance industries) without breaking the lubrication system into modules. Technology involving divider blocks have not changed much in the last 75 years. For example, a lubricating system patent that was published in Jan. 27, 1953 shows a divider block, (the term "divider block" is to be used interchangeably with "divider valve" and "distribution block" that is used in the industry) having U.S. Pat. No. 2,766,847 issued to Harter and assigned to Trabon Engineering Corp ("Trabon"). Trabon currently manufactures a divider block that is very similar to technology that was developed in the mid-1900's. And a search in respective patent classification (both US and internationally) shows very little progress made in this field. FIG. 1 shows Trabon's patent figure showing the lubrication system and is marked as "prior art."

FIG. 2 shows a current model of a divider block currently sold by Trabon and sold as Trabon® MSP Modular Divider Valves. The manual for this model is L10102 and is available at www.graco.com/content/dam/graco/led/literature/flyers/110102/L10102EN-B.pdf. Going back to FIG. 1, this particular prior art system discloses a flow-reversing valve 33 that includes a piston 41 adapted to move from one end of the cylinder 36 to the other end for reversing the direction of the flow. See FIG. 1. Comparing this system with the current system in FIG. 2, the divider block 200 has modular sections 201. The modular sections each have pistons (not shown) in end of the ends 202. These pistons are not much different than the pistons disclosed in FIG. 1.

The current system is dependent on modular sections. There are many reasons why traditional divider blocks require modular sections. The first reason is because these lubrication systems require high levels of proficiency at high speeds and the modular sections allow for the manufacture of internal components and alignment of the pistons in a precise manner. Industrial tools and machines, such as compressors, rely on proper lubrication, to ensure the proper operation and longevity of components. Without proper lubrication internal components risk serious damage. The divider block allows pressurized lubricant to distribute to multiple lubrication points. In traditional divider blocks, the pressurized lubricant causes a set of pistons to move back and forth within the piston bores. The moving pistons open and close internal fluids channels, which allows the user to know the precise volume of fluid that is distributed in the multiple outlet channels. Because the pistons in the divider block are powered by the pressure of the fluid being distributed, no additional source of power is necessary to operate the divider block. These are the divider blocks shown in prior art U.S. Pat. in FIG. 1 and the Trabon model that is currently available.

As shown in FIG. 3, a typical prior art MJ series divider block 300 consists of an inlet section 301 and three to eight valve sections 302. Each single section 302 can have an outlet on either side but the outlet on one side must be plugged for the section to operate properly. There are two manifold bolts 303, 304 that run from the top to the bottom through each of the divider blocks. Each divider block section 305 includes an internal piston (not shown) within a bore (not shown). The manifold bolts 303, 304 connect each of the divider blocks 305. These blocks are held and sealed with gaskets between the inlet, ends, and between each block. The precise manufacture of the internal piston and the valve sections require that the manufacture of these components be made is sections and assembled and tested. The traditional methods of manufacture require the alignment of the pistons for each modular section. The traditional methods of manufacture and using divider blocks require modular sections so that the pistons can be positioned and aligned.

Because these blocks are held together in multiple pieces or sections, the amount of pressure that can be held in the valves is about 3500 psi. During use, if any problems persisted in any of the blocks, the user is first required to remove the tubing from the divider block. Then, the user is required to remove the complete block assembly from the compressor. Next, the user must disassemble and replace the problem block(s).

This type of assembly eventually led to the innovations of baseplates 306 and manifold bolts 303, 304. Base plate section 306 includes internal channels (not shown) for fluid movement and holes for moving fluid between adjacent sections. Each base plate section 306 also includes an outlet (not shown) for dispensing the fluid, and holes for moving fluid in and out of the corresponding divider block sections 305.

One of the problems with the use of multiple divider block sections is that with time the variations of pressure put on different parts of the divider block assembly eventually wears out the divider block. For example, the manifold bolts 103, 104 are deliberately placed outside the center line of the divider block section 105, because centered bolt holes would interfere with internal fluid passages. But with tightening of the mounting fasteners and the end plugs, there are changes in the divider blocks that will eventually result in faulty and imprecise delivery of lubricants. The current mounting fasteners have specific directions to not overturn the screws [not shown]. These mounting fasteners are frequently overturned by users, however, which results in eventual crushing or egg-shaping of the piston bore because of the variation in pressure that results with overturned mounting fasteners The bolts that go through the divider block when overtightened will distort the cylindrical hole that runs lengthwise in the divider block. The precisely drilled hole then becomes egg shaped and causes the piston bore to wear out prematurely or fail immediately. When the bore is egg-shaped it allows lubricant to flow around the piston to the point of least resistance injecting too much lubricant in some areas and starving (reducing) the needed oil in other areas.

What is needed is a lubrication system that allows for higher amounts of pressure in the valves and in the whole system. What is needed is a way to view traditional divider block models and question why they are built in modular sections. What is needed is a way to prevent wear of these divider blocks when users over-tighten screws or change settings within the system.

SUMMARY OF THE INVENTION

An object of the invention is to provide a divider block assembly that is stronger, more efficient, and capable of being repaired upon any failure to the system. Currently, there are no divider blocks in the industry that can be repaired. All of them must be replaced with a new valve section when the piston to bore clearance becomes excessively worn. An object of the invention is to make these divider blocks repairable.

Another object of the invention is to provide an innovative method of delivering lubricants by using a divider block made substantially from one material and in one piece, such as steel, which alters the flow of lubricant in the divider block in a surprisingly beneficial manner.

Another object of the invention is to provide a new method of manufacturing and using one divider block made from one piece and one material.

Another object of the invention is to eliminate the need for O-ring seals which become hardened and fail with extensive service in high temperature applications and disintegrate with exposure to certain types of lubricants.

Another object of the invention is to overcome the challenges of precise alignment of pistons by adding a replaceable sleeve to the system, which holds pistons that are already aligned with the sleeves. These sleeves contain ends that connect with end plugs so that when the user turns the ends, the sleeves get exactly aligned with the flow path. With this new design the end user cannot distort the piston bore because there are no mounting bolts to over tighten.

The embodiments of the current invention disclose a high pressure divider block assembly that is capable of being used under high pressure.

The embodiments of the current invention disclose a replaceable sleeve and piston assembly that acts to replace the traditional pistons within the divider block. By adding this replaceable sleeve to the current divider block system, the end user does not have to replace the complete divider block when a piston becomes worn. Sleeves will act to bring the divider block back to new condition in lieu of replacing the complete traditional modular sections.

The embodiments of the current invention disclose a lubricant delivery assembly made from one material and one piece, such as one piece of steel. Such an assembly can use a replaceable sleeve and piston system that allows for the manufacture and use of a divider block in such a manner.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF THE PREFERRED EMBODIMENTS

Figure 1:
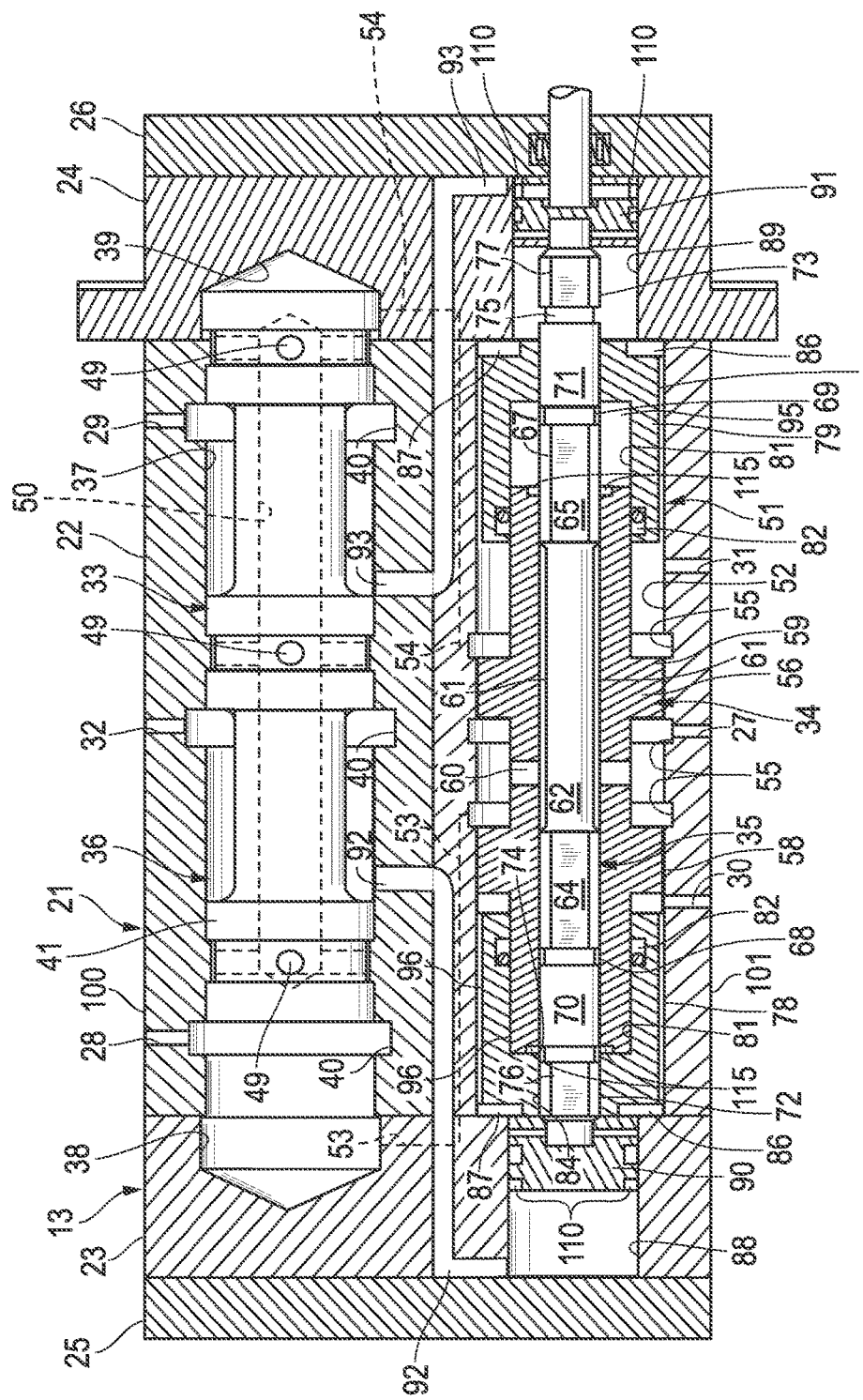
FIG. 1 is a perspective of a prior art divider block.
Figure 2:
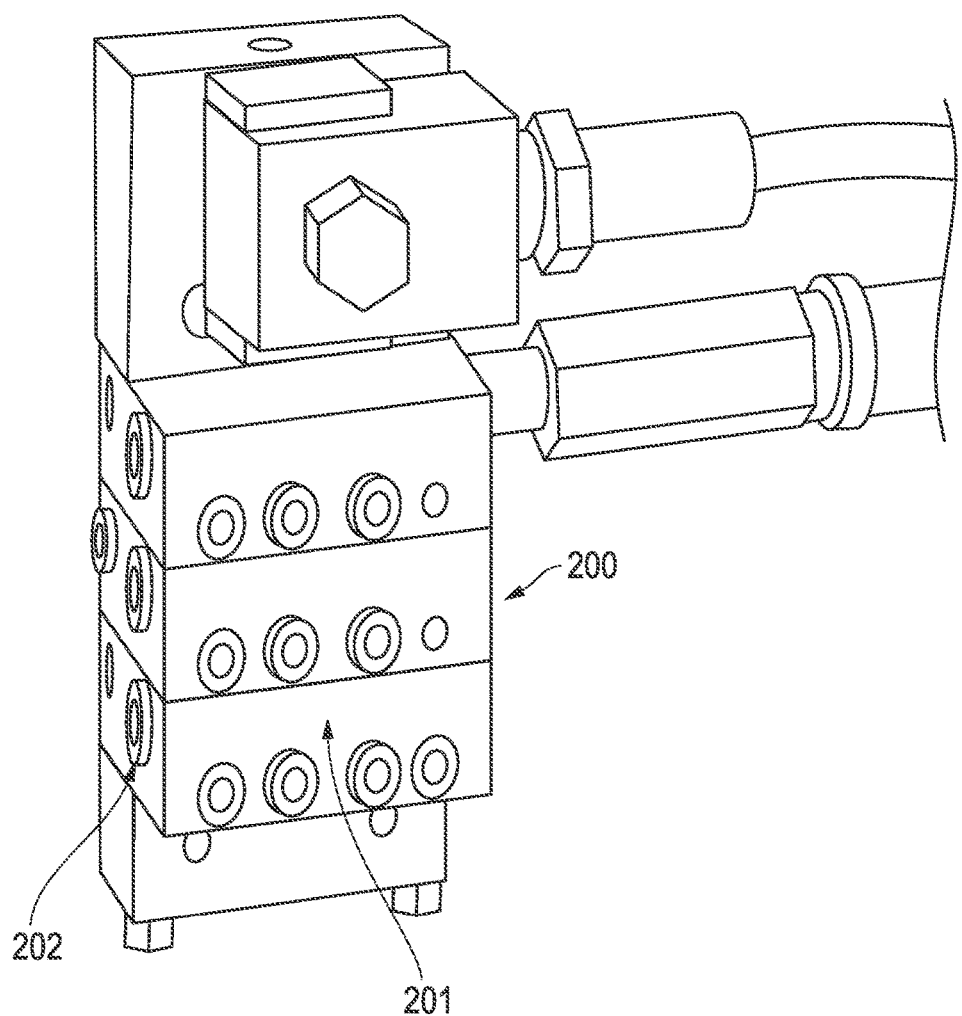
FIG. 2 is a perspective of a more recent prior art divider block.
Figure 3:
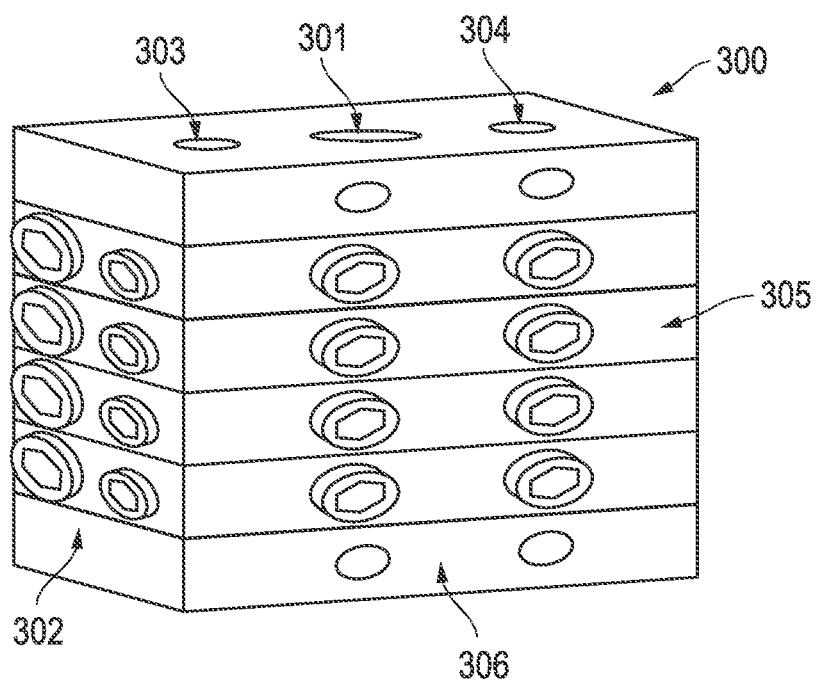
FIG. 3 is a side view of a prior art divider block showing multiple sections.
Figure 4:
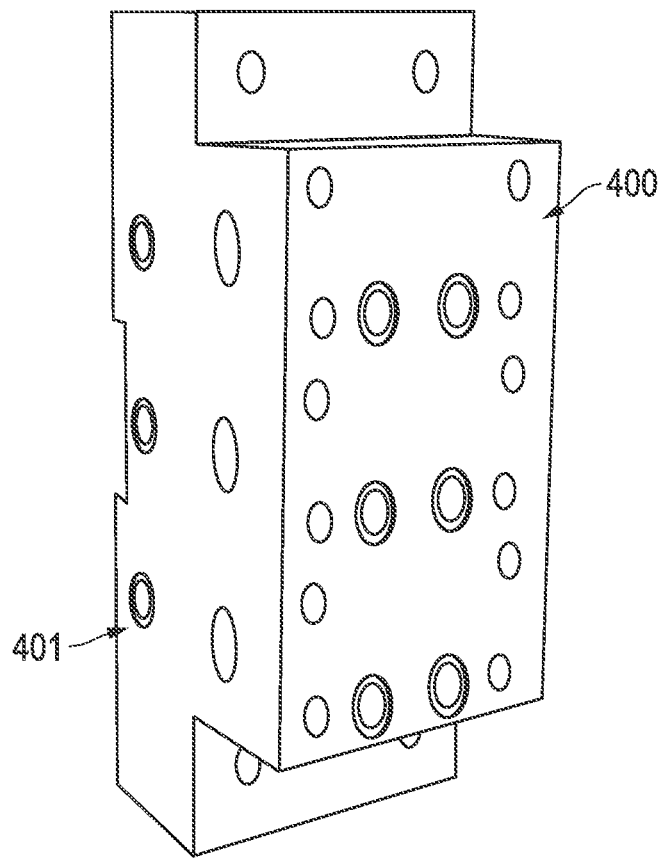
FIG. 4 is side perspective of one embodiment of the current invention showing a mono-block.

The current invention allows for the use of a divider block made from one piece and one material. This "mono-block" (trademark pending) divider block introduces a new type of technology using replaceable and alignable sleeves. FIG. 4 shows a divider block 400 in accordance with one embodiment of the current invention. As shown by the body 401, the divider block is made from a single integral and gapless continuous piece of material. Although at first blush, it may seem that the invention is only making separate, traditional elements into one integral piece, such is not the case. Such integration have traditionally not been patent worthy, but the prior art is significantly different. The inventor in the current case is eliminating the need to calibrate each of the pistons, which led to the multiple segregation of the modular pieces in the first place. The prior art also is perceived with challenges to make a divider block with higher and higher capabilities to deliver precise amounts of lubricant. The mono-block allows a user to achieve pressures much higher than 3500 psi, which has been considered the capable modern limit. According to embodiments of the current invention, pressures as high as 10,000 psi is capable with the monoblock divider.

The manufacture of a one piece assembly has surprising and potentially commercially-significant benefits. Because the manufacture of the divider blocks can be made from one material, such as carbon steel or stainless steel, the use of traditional O-rings is removed. The removal of O-rings reduces a large percentage of the errors that often result with traditional divider blocks. The use of modular sections also required a sophisticated maze of lubrication pathways so that each modular section matches exactly with another. By making a mono-block, these lubrication pathways are shorter and much more efficient (not shown and subject to design patents).

Other materials are contemplated for the mono-block assembly, including but not limited to, aluminum, magnesium, copper, tin, zinc, lead alloy, graphite and other composite materials. Because the process involves the manufacture of only one piece made from one material, different and simpler processes to manufacture the divider blocks are contemplated, such as the ability to use special molds (or moulds) and casting processes. Although it is one piece and generally one material, more than one alloy can be used in the manufacture of a one piece divider block. The divider block 400 can be made from a permanent mold casting methods and forging methods that are used for current manufacture of automobile pistons or internal combustion engine pistons.

Figure 5:
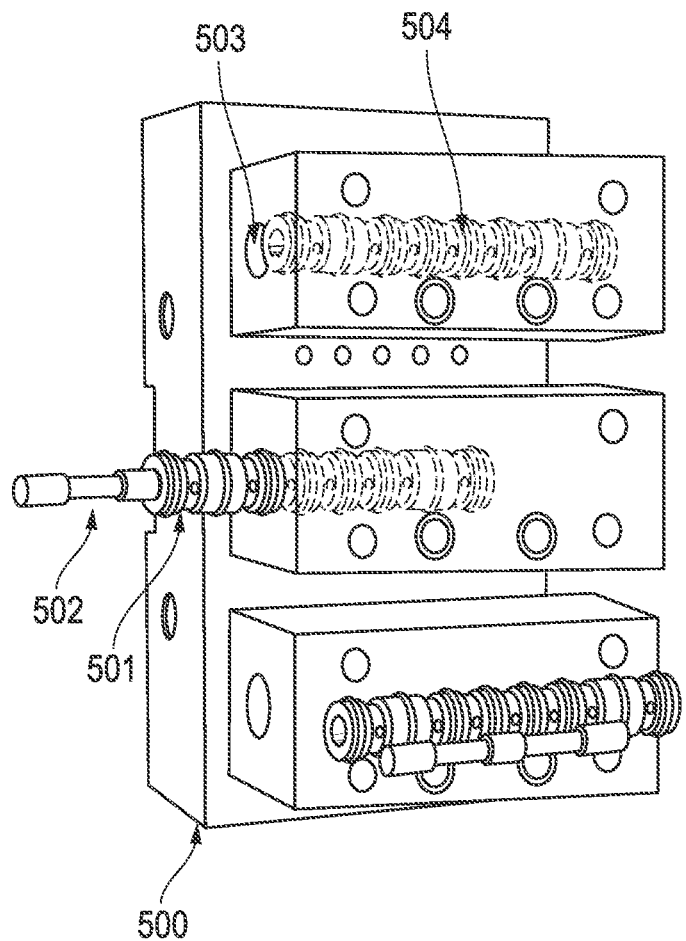
FIG. 5 is an x-ray perspective of one embodiment of the current invention showing a mono-block.

FIG. 5 shows an X-ray view of the mono-block 500 in accordance with one embodiment of the current invention. The system includes replaceable sleeves 501 that are calibrated precisely to hold and align pistons 502 within its body. The sleeves 501 and the pistons 502 allow for the interchangeability of these components without having to dissemble any of the modular sections. In the past, when any of the pistons proved faulty, the whole divider block required disassembly and reassembly with a new divider block. The current invention allows a user to interchange any of the sleeves and pistons without having to disconnect tubing lines and tube fittings from the divider block or dissemble the divider block. The sleeves 501 enter the piston bore 503. The sleeves are lined with a set of O-rings to stabilize and seal and separate the hydraulic circuits and the sleeves in the divider block bore.

Figure 6:
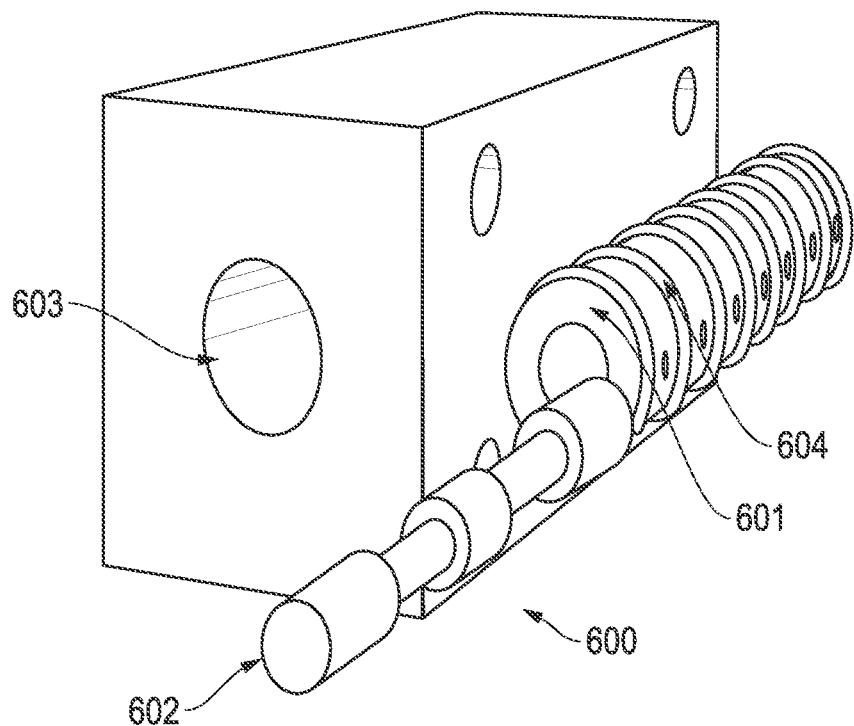
FIG. 6 is a close-up perspective of the piston and sleeve that is utilized in one embodiment of the current invention.

FIG. 6 shows a close-up model of sleeve and piston system 600. Sleeve 601 is configured to fit pistons 602 in a precise fit. The manufacture of these materials can be steel or alloy as discussed above regarding the body of the mono-block. The sleeve is sized to fit within the piston bore 603. Once positioned inside the channel of piston bore 603, the sleeve sits comfortably on a bed of O-rings 604. Although this invention purports to remove the use of O-rings, it is the O-rings in the base plate and divider block section that the invention eliminates the need for. These O-rings traditionally ensured a seal within the base plate and divider block sections (not shown), but since no base plates are necessary, no such O-rings are necessary. This area has in the past been a source of frequent problems that led to leaks under various conditions. The invention of the monoblock eliminates the need to secure leakages due to the design enabling the use of one solid piece of material.

The mono-block assembly provides many benefits. There is the ease and simplicity of manufacturing one component (steel block) rather than multiple components that must be bolted together. Further, the amount of pressure that the assembly can handle during the cycle of lubrication is much higher than the standard pressure. The mono-block is made from one piece of material, such as steel, and the stress strain expansion is thus reduced. The replaceable sleeves and pistons allow for a more efficient usage and ease of fixing during any type of malfunction. And perhaps the largest benefit comes from the reduced cost and maintenance due to the reusability of the divider block housing with interchangeable pistons and sleeves.

Figure 7A:
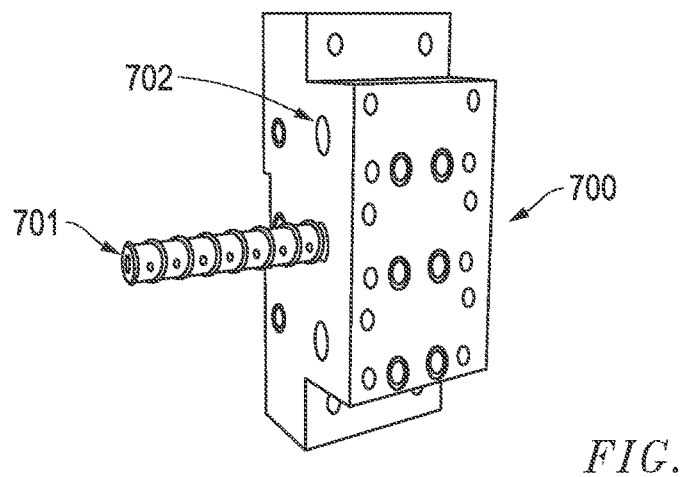
FIG. 7A-C illustrates an embodiment in accordance with the invention that shows the sleeve interchangeability.
Figure 7B:
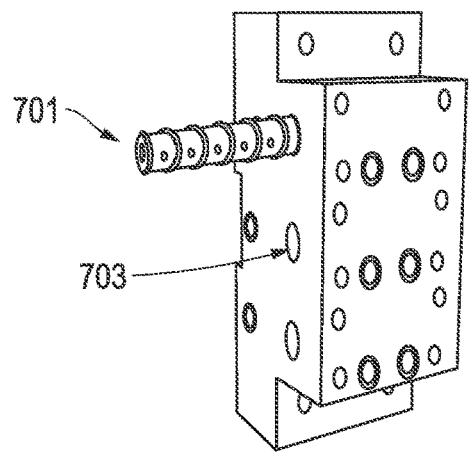
Figure 7C:
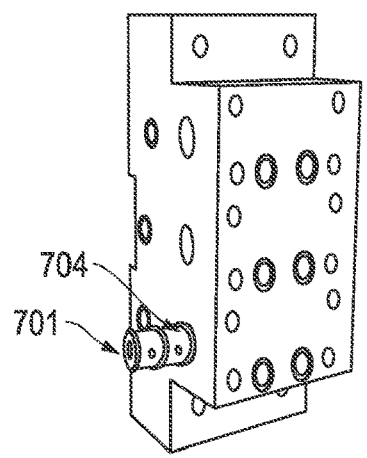

FIGS. 7A-7C show how sleeves 701 are interchangeable even within its own system 700. Sleeve 701 fits within piston bore 702, 703, and 704. The interchangeability of these sleeves proves to have beneficial results that far exceeded performance expectations when compared to other similar technology. Unlike previous systems that required the replacement of the whole system during repairs, users are now only required to open the piston bore and replace the sleeve having a piston. This far reduces time, cost and efficiency of a production line and field replacement.

In an industry that currently removes and disposes the divider blocks when the pistons become worn and when pistons start to bypass, the current invention is less wasteful and less costly to the end user. The replaceable sleeves and pistons are estimated to cost 75% less to manufacture. Further, the disposal of the steel divider blocks creates tons of waste steel that cannot be reused while replaceable sleeves and pistons would produce only a fraction of such waste.

The use of a monoblock divider also eliminates distortion in the piston bore, which are often caused by over-tightening of the mounting bolts on individual divider block sections. These mounting bolts often come with specific directions directing users not to over-tighten, but the torque values are only 60 inch pounds which is very minimal so users have a natural tendency to tighten more than necessary, which always results in the distortion in the piston bore. The monoblock divider also eliminates leak paths caused by the use of O-ring seals which are used in all industry standard divider blocks and allows for fewer machined components.

The configuration of the sleeves 701 and pistons allows for the user to replace the internal piston and not the complete divider block. It enables the operator to easily change the piston. It also has the ability to reconfigure the output capacities of each individual piston. Each replaceable piston and sleeve assembly is replaceable with a different assembly with different output capacities. The size of the replaceable pistons can be altered with different desired applications. Each sleeve combination 701 is designed and with specific sizes of pistons to allow the accurate output of lubricant capacity and honed scientifically honed for piston to sleeve clearances of 80,000,000 (millionths of an inch) to move back and forth with lubricant pressure.

Figure 8:
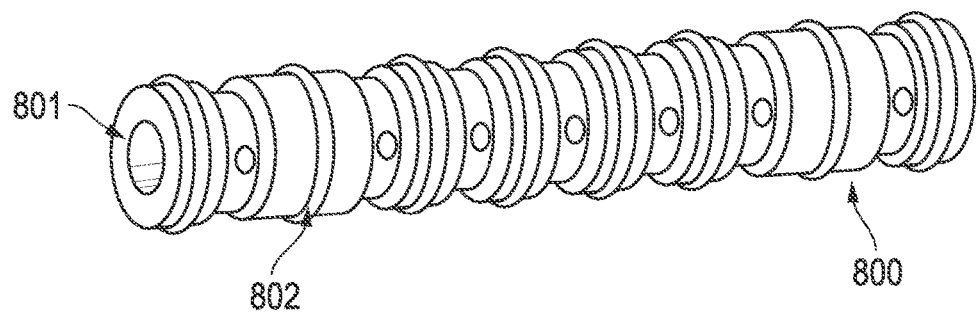
FIG. 8 shows a close up of a replaceable sleeve in accordance with embodiments of the current invention.

According to one embodiment of the current invention and FIG. 8, a close up of the replaceable sleeve 800 is shown. The stainless steel sleeve has a precise center cavity 801 that enables the piston to be hone fitted to tolerances of 80 millionths of an inch. The sleeve 800 sits precisely within the divider block bore resting on a number of O-rings 802.

Figure 9:
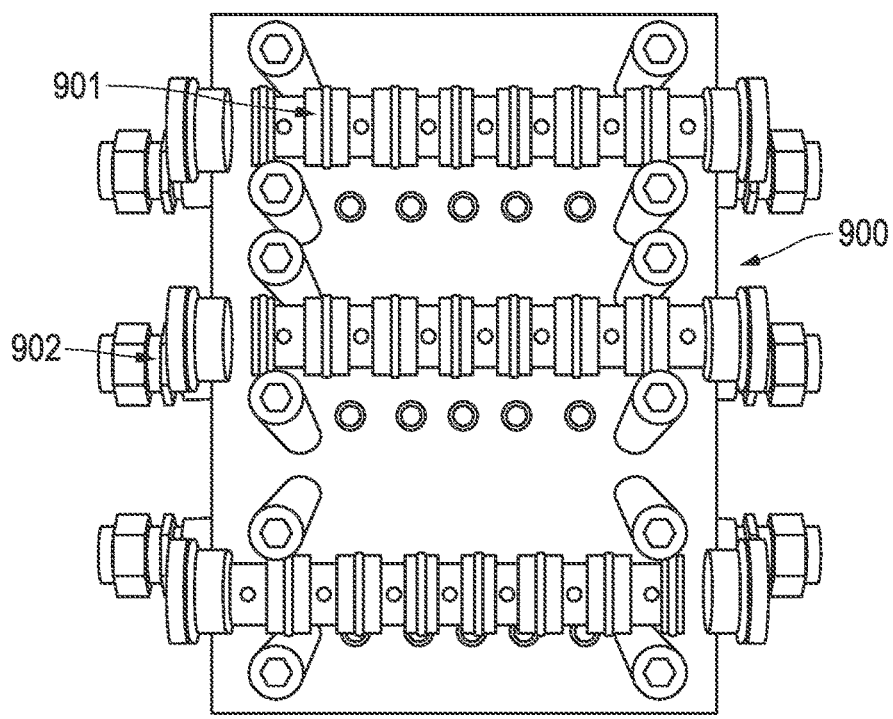
FIG. 9 illustrates the alignment of the sleeve system in accordance with embodiments of the current invention.

FIG. 9 shows a system 900 in accordance with one embodiment of the current invention wherein the alignment of the sleeve 901 is shown.

Figure 10:
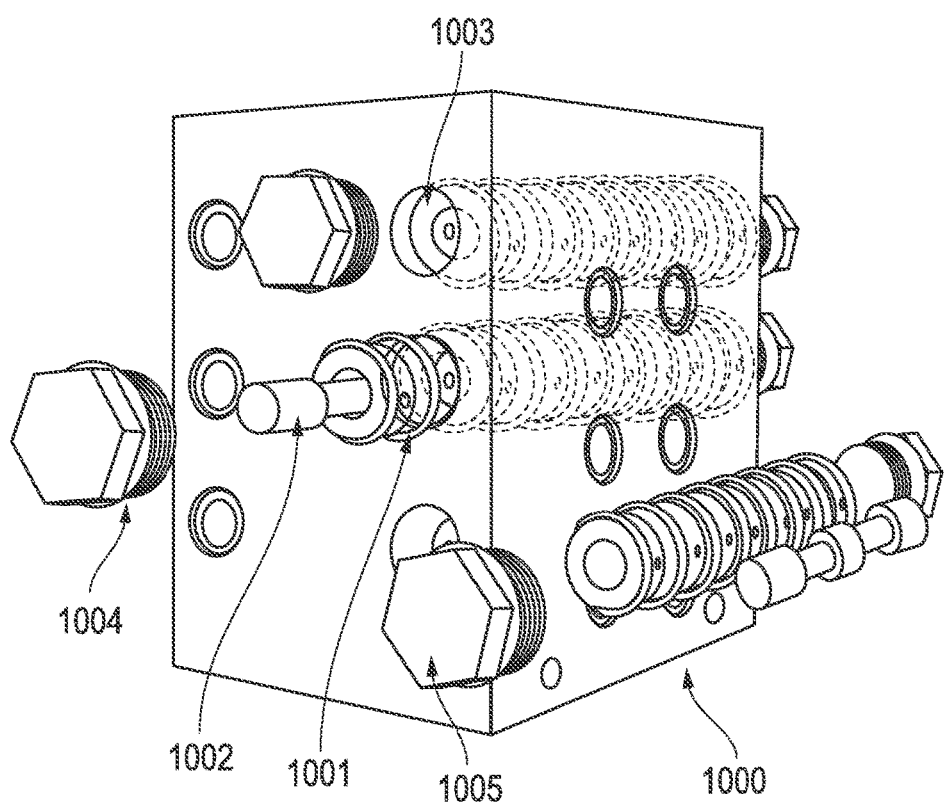
FIG. 10 shows an embodiment of the current system in accordance with embodiments of the current invention.

FIG. 10 shows a complete mono-block assembly 1000 shown with the inside components. In accordance with the methods of using a monoblock divider described in this specification, a user can install a sleeve 1001 with the piston 1002 into sleeve channels in the divider block 1003. The sleeve 1001 and piston 1002 assembly comes with the lubricant preinstalled on the sleeve, so no lubricant is needed. According to one embodiment of the invention, the user then slides an O-ring compressor over the top of the sleeve 1001 assembly and tightens a wing nut on the O-ring compressor (not shown). The user then slides the sleeve 1001 into sleeve channel 1003 until it reaches the end of the divider block body. The sleeve 1001 sits firmly on the machined indention on the end of the divider block body (not shown). Once that is finished, the user pushes on the end of the sleeve 1001 and piston 1002 assembly with a wooden rod (or some form of pushing device) until the sleeve 1001 and piston 1002 assembly bottoms out on the opposite end of the divider block body. A second O-ring 1004 is sealed to the end plug 1005 and both end plugs replaced. The O-ringed sleeve channel 1003 that houses the piston 1002 is installed using a compression device that compresses the O-rings so the operator can install the sleeve without cutting the O-rings. This is similar to the compression device used to compress the rings on a piston to eliminate breaking the piston rings in the automobile industry when a mechanic is installing them in an engine block.

As shown by the end plug 1005, the exact alignment precision that is necessary was traditionally made by fitting the pistons into an exactly aligned piston tube. By using the sleeve system, the alignment is made by the connection made between the piston and the sleeve and from the end plugs 1005. The end plugs 1005 tighten over the end of each of the sleeves. By connecting (either by screw or by physical alignment) the end plugs 1005 place the sleeve 1001 and the pistons 1002 in exact perfect alignment of the hydraulic circuit every time during installation.

Because of the replaceable sleeve, there are no gaskets and no O-rings (except for the O-rings that seal the end plugs). This allows for a much faster and efficient method of repairing the divider block system and less likely to cause any type of error. In addition, the use of these replaceable piston/sleeves allows for the manufacture of only one size piston block housing. Conventional multiple divider blocks allows for about 3000 psi of operating pressure due to stress strain expansion. At most, the current multiple divider blocks allow for about 3500 psi. With the use of the monoblock, operating pressures up to 8,000 psi can be reached.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A divider block assembly for distributing a low volume of a lubricant at high pressure, the divider block being operated by the pressure of the lubricant being dispensed, comprising:

one divider block made from a single integral and gaplessly continuous piece of material having; at least one inlet, at least one outlet, at least three piston bores;

at least three replaceable sleeve assemblies, each replaceable sleeve assembly positioned within one of the three piston bores, each of the replaceable sleeve assemblies including:

a replaceable sleeve with an outlet passage for lubricant and multiple compressible O-rings positioned along the exterior of the sleeve to securely hold the sleeve within an associated piston bore sized to receive the replaceable sleeve assembly to define a hydraulic circuit through the bore and sleeve, the O-rings having a dimensional relation to an associated one of the at least three piston bores such that the O-rings must be compressed to fit the sleeve within its associated bore, and a solid piston in the replaceable sleeve which dispenses lubricant by the pressure of the incoming lubricant; and at least one end plug corresponding to each of the at least three piston bores, each end plug aligned with the corresponding replaceable sleeve and fixing the position of the replaceable sleeve within the piston bore.

2. The divider block assembly of claim 1 wherein the divider block is made from stainless steel.

3. The divider block assembly of claim 1 wherein the divider block is made from carbon steel.

4. The divider block assembly of claim 1 wherein the divider block is made from composite.

5. The divider block assembly of claim 1 wherein the replaceable sleeve comes in various lubricant output capacities, which can be replaced even after initial use.

6. The divider block assembly of claim 1, wherein the at least one end plug connects with the replaceable sleeve further aligning the piston with the flow of lubricant in the hydraulic circuit.

* * * * *